United States Patent [19]
Chicklis

[11] 4,355,893
[45] Oct. 26, 1982

[54] EYE-SAFE LASER CLOUD HEIGHT RANGEFINDER

[75] Inventor: Evan P. Chicklis, Nashua, N.H.

[73] Assignee: Sanders Associates, Inc., Nashua, N.H.

[21] Appl. No.: 184,850

[22] Filed: Sep. 8, 1980

[51] Int. Cl.³ .......................... G01C 3/08; H01S 3/00
[52] U.S. Cl. ............................................ 356/4; 356/5; 372/40; 372/41
[58] Field of Search .................... 356/4, 5; 331/94.5 F

[56] References Cited

U.S. PATENT DOCUMENTS

| | | | |
|---|---|---|---|
| 3,556,657 | 1/1971 | Quelle, Jr. | 356/4 |
| 3,963,347 | 6/1976 | Segre et al. | 356/5 |
| 3,972,007 | 7/1976 | Naiman et al. | 331/94.5 F |

OTHER PUBLICATIONS

M.V. Petrov et al., Optical Spectroscopy (USSR) 45, pp. 81–85, Jul. 1978.

Primary Examiner—S. C. Buczinski
Attorney, Agent, or Firm—Louis Etlinger; Richard I. Seligman

[57] ABSTRACT

An eye-safe laser cloud height rangefinder comprising an Er:LiYF$_4$ laser operating at 1.73 μm and a germanium detector.

16 Claims, 3 Drawing Figures

EYE-SAFE LASER CLOUD HEIGHT RANGEFINDER

BACKGROUND OF THE INVENTION

This invention relates to laser systems and, more particularly, to laser systems for measuring the height of clouds.

There are many requirements for laser systems both for military and commercial uses. One such application is to accurately measure the ceiling at airports. These cloud height finders or ceilometers may be required at all airports and because of the proximity to general segments of the population, it is necessary that such ceilometers present no danger to them. The greatest potential danger is eye damage from the laser radiation.

It has been determined that the absorption of laser radiation by the ocular fluid varies with wavelength. For 1.06 μm lasers, the wavelength most commonly used in current laser systems, the Maximum Permissible Exposure (MPE—the permitted fluence at the cornea) is approximately $0.5 \times 10^{-6} J/cm^2$. Thus, systems employing 1.06 μm lasers must limit their emissions to this amount. Compatible silicon photodiodes are highly efficient, yet with the low emission limitation, signal to noise ratio of relatively low cost systems employing 1.06 μm lasers may not suffice for cloud height finding applications.

In order to overcome the low MPE of the 1.06 μm lasers, other wavelengths have been investigated. It is known that laser radiation of λ1.4 μm is absorbed by the corneal fluid so that (in general) it is not imaged on the retina. Laser sources whose radiation is thus absorbed are called "retinal safe". The absorption of the corneal fluid varies with wavelength in this region, but in all cases it is sufficiently high to result in a much higher allowable corneal irradiance. Ocular damage can occur in this region, but the mechanism is quite different from damage in the corneal transparent region. Absorption in the corneal fluid raises its temperature and can eventually result in irreversible biological damage. The threshold for this type of damage is much higher than for damage in the corneal transparent region.

Because of the greater allowable corneal irradiance, retinal safe lasers can emit higher energies at the exit aperture than lasers in the corneal transparent region, while maintaining eyesafe operation.

U.S. Pat. No. 3,963,347 to Segre et al teaches the use of an Erbium laser ceilometer which utilizes an Erbium:glass laser emitting at 1.54 μm. This device offers the advantage of an eye-safe system, but has never been successfully implemented due to difficulties with the laser.

Erbium doped glass, emitting at 1.54 μm, disclosed in U.S. Pat. No. 3,446,657 to Quelle, was the first laser developed specifically for eyesafe applications. This is a "three level" laser material which utilizes the $^4I_{13/2}$–$^4I_{15/2}$ transition of the $Er^{3+}$ ion.

The $^4I_{13/2}$ level of $Er^{3+}$ is difficult to pump (the excited level above $^4I_{13/2}$ do not relax rapidly to this level), and the three level nature of the transition requires a high upper level population. The best performance of this laser has been obtained by sensitizing Er doped phosphate glasses with $Yb^{3+}$ and by providing an outer cladding for the rod (consisting of $Nd^{3+}$ and $Yb^{3+}$) which absorbs some of the pump radiation and converts it to radiation absorbed by the central core of active material.

In spite of this optimization, Er:Glass lasers exhibit very high pulsed thresholds (typically 200 joules input per pulse) and require flashlamp pulsewidths of approximately 3 ms. The long flashlamp pulsewidth is required because of the slow pumping rate of the upper laser level and to better match the spectral output of the lamp with the $Yb^{3+}$ absorption at 1 micrometer. The long flashlamp pulsewidth has several detrimental effects including:

a. a very heavy and complex pulse forming network with large (electrolytic) capacitors and inductors required;

b. the likelihood of multiple pulsing in Q-switched operation is greatly enhanced because of the long flash duration and the slow transfer time; and c. the amplitude of the laser output is difficult to control because the thermal input results in thermal stress and thermal lensing.

The latter property can result in focusing of the high power Q-switched radiation inside the resonator with the attendant likelihood of laser damage. Solid state lasers pumped with shorter flashlamp pulses (1–200 μs) and at lower input energies, do not exhibit this behavior because the output occurs before the thermal induced distortion can propagate throughout the crystal and the thermal load is lower.

In addition to these difficulties, the clad phosphate based glass is extremely difficult to fabricate with low scattering and reproducibly low laser damage threshold.

Er:Glass is, thus, not an effective material for use in laser ceilometers.

Accordingly, it is an object of this invention to provide an improved eye-safe laser cloud height finder.

SUMMARY OF THE INVENTION

Because of the disadvantages of Er:Glass as an effective eye-safe laser for cloud height finders, it became necessary to investigate other laser materials for ceilometer applications. In this investigation $Er:LiYF_4$ at 1.73 μm was considered. However, generally, it was disregarded by the experts because high efficient detectors at this wavelength were unavailable. Ge compatible detectors have such a low absorption coefficient at 1.73 μm that it was not thought possible that they could provide sufficient speed of response and sensitivity for this application.

This disregard of $Er:LiYF_4$ at 1.73 μm for cloud height finding applications proved in error since it was not realized that the return signal from clouds, as contrasted to hard targets, is temporarily long due to the spatial extent of the target. The Ge detectors, thus, would provide sufficient signal strength for these applications since their signal output rises substantially for longer inputs thereto.

The preferred cloud height finder system, thus, includes a $Er:LiYF_4$ laser transmitting 1.73 μm radiation skyward, means for collecting return radiation from the clouds and a Ge detector.

BRIEF DESCRIPTION OF THE DRAWINGS

The above-mentioned and other features and objects of this invention will become more apparent by reference to the following description taken in conjunction with the accompanying drawings, in which.

DESCRIPTION OF PREFERRED EMBODIMENTS

Figure 1:
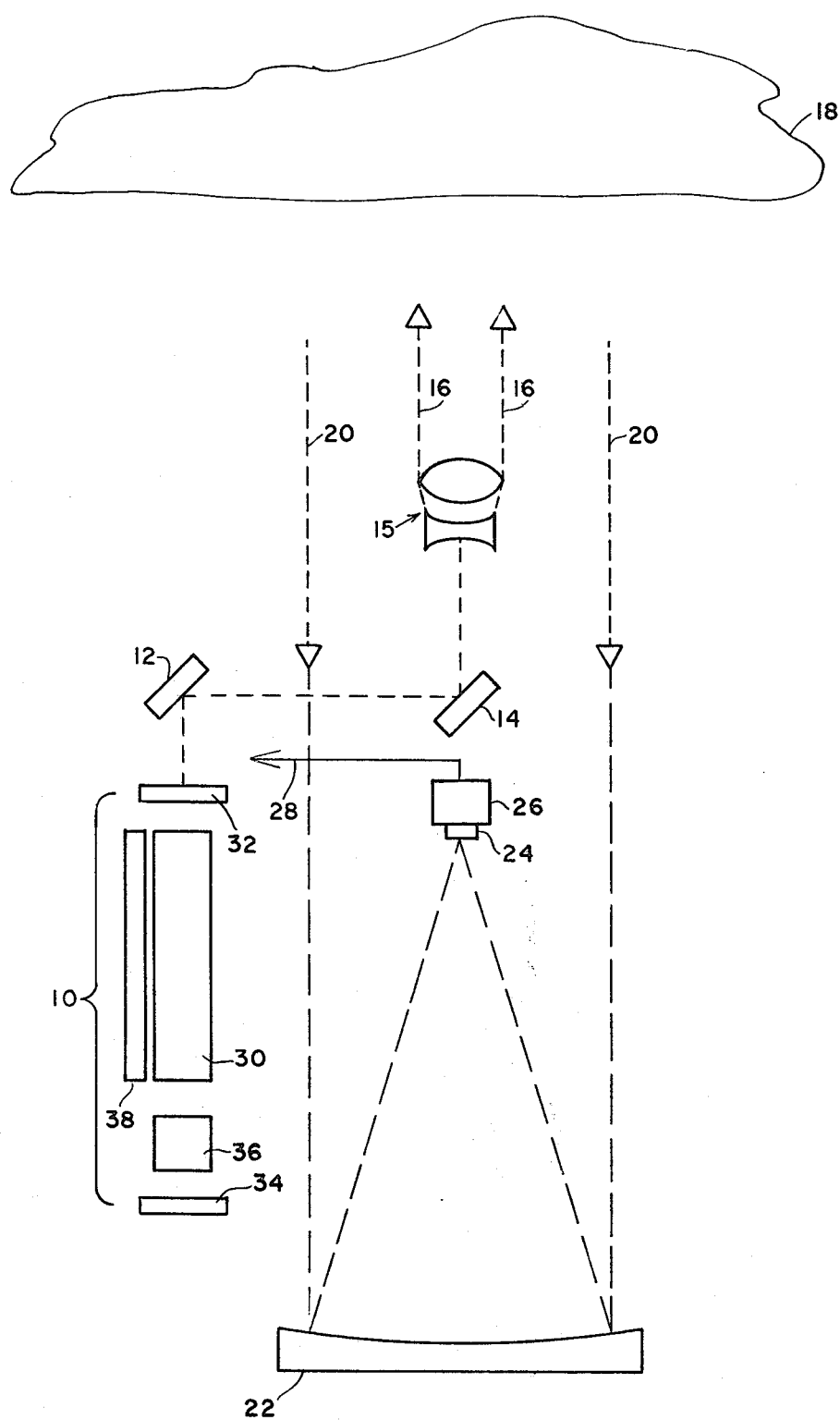
FIG. 1 is a block diagram of a cloud height finder measuring system.

Referring now to FIG. 1 of the drawings, there is illustrated thereby a cloud height finder comprising a transmitter including a Q-switched Er:LiYF$_4$ laser 10 so configured to emit radiation at 1.73 μm. The output from transmitter 10 is directed skyward to measure cloud heights. The output from the transmitter is redirected toward the sky by a pair of fold mirrors 12 and 14. Of course, other means can be employed to redirect the beam from laser 10 such as prisms.

The redirected radiation from laser 10 is applied to diverging optics 15 to generate a beam 16 which is radiated upwardly. The beam 16 is diverged to maintain a fluence level of less than 10 mJ/cm$^2$ at any point in the beam, which provides eyesafe operation. When beam 16 encounters a cloud 18 it reflects therefrom as beam 20.

The return beam 20 is received by a mirror 22 which directs it to a detector 24. Detector 24 is preferably a Ge detector which is wavelength compatible with the Er:LiYF$_4$ laser, is inexpensive and provides ample output signal because of the nature of the target as discussed hereinbefore.

An amplifier 26 amplifies the signal from detector 24, and provides an output 28 which is used to measure the time between transmission of beam 16 and reception of beam 20 to permit calculation of the height of cloud 18.

The laser 10 includes a rod 30 disposed in a resonant cavity defined by mirrors 32 and 34. A Q-switch 36 is also disposed within the resonant cavity. The rod 30 is pumped by a flashlamp 38. The electronics for flashlamp 38 and Q-switch 36 is omitted, however, as it is conventional.

The laser rod 30 comprises a LiYF$_4$ host material with preferably between 1 to 7.5% Er$^{3+}$ substituted at the Y$^{3+}$ site in the crystal. This range of Er$^{3+}$ concentration has good absorption of the pump radiation and an upper level lifetime sufficiently long to permit flashlamp pulses on the order of 100 microseconds. Higher concentrations will require shorter lamp pulses which will result in impractically short flashlamp life. Lower concentrations reduce pumping efficiency requiring larger energy inputs which can also reduce lamp life.

Mirror 34 is 100% reflecting at the transmitting wavelength of 1.73 μm while transmitting on the order of 30% at 0.85 μm and 1.23 μm. Mirror 32 is partially transmitting at 1.73 μm (approximately 5-10%) while transmitting approximately 30% at 0.85 μm and 1.23 μm. The 30% transmission of the mirrors 32 and 34 prevent competitive laser oscillations at 0.85 μm and 1.23 μm from the common upper laser level which is required because these other wavelengths may not be eye-safe. Alternatively, instead of providing two mirrors having 30% transmissivity at the undesired wavelengths, one of the mirrors may be 50% transmissive.

Q-switch 36 is preferably a LiNbO$_3$ Q-switch for generating a normal 100 ns output pulse.

Er:LiYF$_4$ is preferred as the laser for this system since like Er:Glass, Er:LiYF$_4$ laser is "eye safe" and utilizes erbium as the active ion.

However, Er:LiYF$_4$ much more resembles Md:YAG than Er:Glass in that:

a. it is a "four level" transition;
b. it does not rely on sensitization;
c. it is pumped by short flashlamp pulses; and
d. it has a low threshold of operation.

Properties (a), (b) and (c) are desirable in order to eliminate the tendency to multiple pulsing that is observed in long transfer time lasers such as Er:Glass. The "four level" nature of the laser transition results in an independence of the population inversion to temperature. The specific gain (stimulated emission cross section) and the upper level fluorescence lifetime exhibit a weak dependence with temperature. As a result the laser output is far less sensitive to temperature than is the case with a "three level" laser with a thermally occupied terminal level such as Er:Glass or Ho:α-LiYF$_4$.

Figure 2:
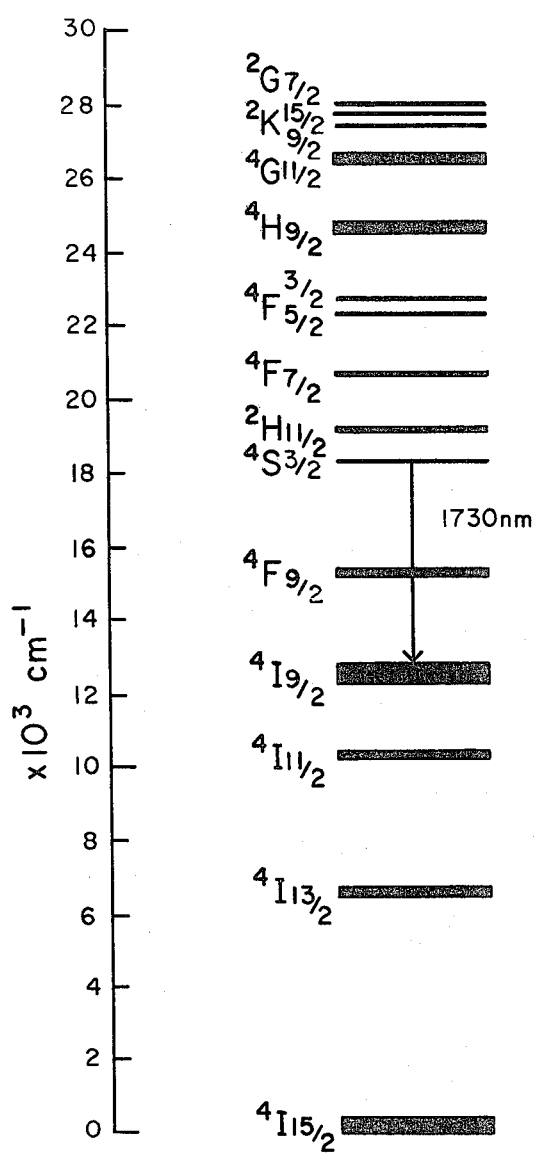
FIG. 2 is an energy level diagram of Er:LiYF$_4$.

The spectroscopy of Er$^{3+}$ in LiYF$_4$ has been investigated in detail. The level diagram of Er$^{3+}$ is shown in FIG. 2. The 1730 nm laser transition in LiYF$_4$ utilizes the $^4S_{3/2}$–$^4I_{9/2}$ transition; the terminal manifold ($^4I_{9/2}$) is far removed from the ground state and so its thermal population is negligible. The transition is a true four level laser. The pump bands for Er:LiYF$_4$ extend from about 0.20–0.530 μm and couple efficiently to the emission of Xe flashlamps. All the pump bands relax to the upper laser level very rapidly ($\leq 1$ μs).

Figure 3:
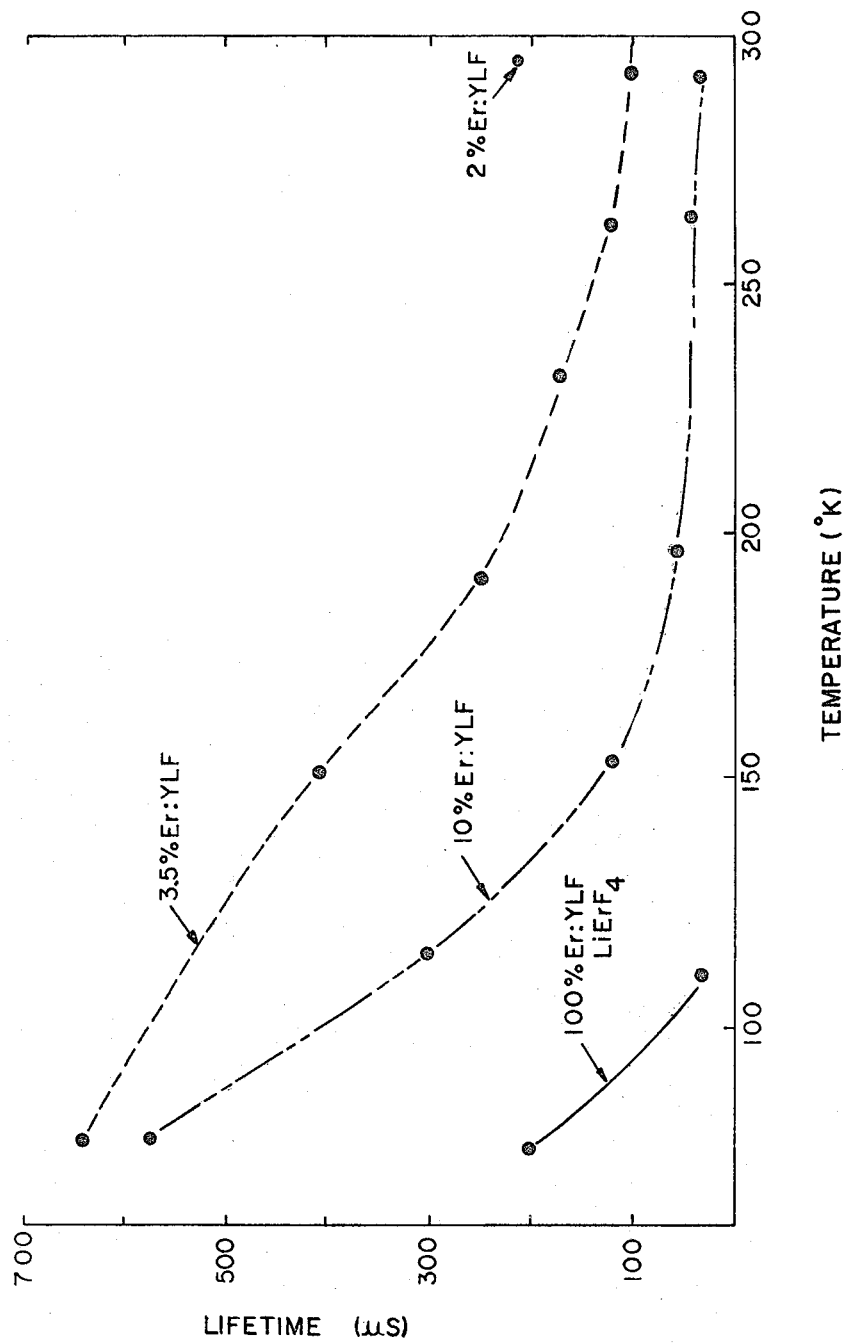
FIG. 3 is a plot of the upper level lifetime versus concentration and temperature for Er:LiYF$_4$.

In LiYF$_4$ arbitrary amounts (up to 100%) of Er$^{3+}$ can be substituted for Y$^{3+}$ without degradation of crystalline quality. Since the 1.73 μm transition is four level, the active ion density does not affect threshold inversion. However, the Er$^{3+}$ concentration does affect pumping efficiency and fluorescence lifetime as discussed hereinbefore. FIG. 3 shows the upper level lifetime vs concentration and temperature. In the region of room temperature, the temperature dependence is weak and the concentration dependence strong.

The range of useful active ion concentrations for the 1.73 μm transition has been found to be between 1.0% and 10% Er at room temperature. At this doping level, the upper level lifetime varies between approximately 300 μs and 25 μs. The optimum concentration depends on the desired energy output and flashlamp life.

While the system described is generally eye safe, it does not meet the class I standards; however, these can be met merely by expanding the beam 16 to maintain the fluence below the class I limit at the exit aperture of the device. Also, the various components illustrated are only exemplary and other functionally equivalent components can be substituted therefor. Thus, it is to be understood that the embodiment shown is illustrative only, and that many variations and modifications may be made without departing from the principles of the invention herein disclosed and defined by the appended claims.

I claim:

1. An eye-safe laser rangefinder comprising:
   a transmitter which radiates energy toward the sky at a wavelength of 1.73 micrometers, said transmitter including a Q-switched laser comprising an erbium doped yttrium lithium fluoride rod disposed with a resonant cavity including first and second mirrors, with at least one of said mirrors being sufficiently transmissive at 0.85 μm and 1.23 μm so as to prevent laser oscillations at these non-eye-safe wavelengths; and
   a receiver having a detector which is responsive to radiation at 1.73 micrometers and which is adapted to receive reflected radiation from the radiation incident on the clouds.

2. The system of claim 1 wherein said rod has a concentration of erbium of 2 to 7.5%.

3. The system of claim 1 wherein said first mirror has a transmissivity of approximately 5 to 10% at 1.73 μm, said second mirror being substantially 100% reflecting at 1.73 μm.

4. The system of claim 1, further including means for altering the output from said transmitter so that it is transmitted in a line substantially coaxial with said receiver.

5. The system of claim 1 wherein said detector is a germanium detector.

6. The system of claim 5 wherein said receiver includes means coupled to said germanium detector to amplify the output signal thereof.

7. The system of claim 1 wherein said receiver includes a mirror for receiving reflected radiation from clouds and for focusing same onto said detector.

8. A method of determining cloud height, comprising the steps of:
providing a Er:LiYF$_4$ laser which outputs coherent radiation at 1.73 micrometers and prevents oscillations at 0.85 micrometers and 1.23 micrometers;
transmitting said radiation toward clouds;
providing a detector which is responsive to said 1.73 micrometers radiation; and
receiving reflected radiation from said clouds at said detector.

9. An eye-safe ceilometer, comprising:
a laser including a Er:LiYF$_4$ rod having an Er concentration of from 1.0 to 7.5% and a Q-switch disposed within a cavity defined by first and second mirrors, said mirrors configured to permit laser oscillations at 1.73 μm and prevent oscillations at 0.85 μm and 1.23 μm;
means for expanding the beam from said laser and transmitting same toward the sky; and
means for receiving reflections from clouds including a detector responsive to 1.73 μm radiation.

10. An eye-safe laser rangefinder, comprising:
a transmitter which radiates energy toward the sky at a wavelength of 1.73 micrometers, said transmitter including a Q-switched laser comprising an erbium doped yttrium lithium fluoride rod disposed within a resonant cavity including first and second mirrors, said first mirror having a transmissivity of approximately 5 to 10% at 1.73 μm and substantially 30% at 0.85 μm and 1.23 μm, with said second mirror being substantially 100% reflecting at 1.73 μm and having a transmissivity of approximately 30% at 0.85 μm and 1.23 μm; and
a receiver having a detector which is responsive to radiation at 1.73 micrometers and which is adapted to receive reflected radiation from the radiation incident on the clouds.

11. An eye-safe laser rangefinder, comprising:
a transmitter which radiates energy toward the sky at a wavelength of 1.73 micrometers, said transmitter including a Q-switched laser comprising an erbium doped yttrium lithium fluoride rod disposed within a resonant cavity including first and second mirrors, said first mirror having a transmissivity of approximately 5 to 10% at 1.73 μm, said second mirror being substantially 100% reflecting at 1.73 μm, with one of said mirrors being substantially 50% transmissive at 0.85 μm and 1.23 μm; and
a receiver having a detector which is responsive to radiation at 1.73 μm and which is adapted to receive reflected radiation from the radiation incident on the clouds.

12. An eye-safe laser rangefinder, comprising:
a transmitter which radiates at 1.73 micrometers, said transmitter including a Q-switched laser comprising an erbium doped yttrium lithium fluoride rod disposed within a resonant cavity including first and second mirrors, with at least one of said mirrors being sufficiently transmissive at 0.85 μm and 1.23 μm so as to prevent laser oscillations at these non-eye-safe wavelengths; and
a receiver having a detector which is responsive to radiation at 1.73 micrometers.

13. The system of claim 12 wherein said rod has a concentration of erbium of 2 to 7.5%.

14. The system of claim 12 wherein said first mirror has a transmissivity of approximately 5 to 10% at 1.73 μm, said second mirror being substantially 100% reflecting at 1.73 μm.

15. The system of claim 12 wherein said first and second mirrors are substantially 30% transmissive at 0.85 μm and 1.23 μm.

16. The system of claim 12 wherein one of said mirrors is substantially 50% transmissive at 0.85 μm and 1.23 μm.

* * * * *